Patented Dec. 29, 1925.

1,567,785

UNITED STATES PATENT OFFICE.

LOUIS G. BOURGOIN, OF MONTREAL, QUEBEC, CANADA.

PROCESS FOR THE ACETYLENATION OF FATTY AND OTHER SUBSTANCES.

No Drawing.  Application filed October 23, 1924.  Serial No. 745,494.

*To all whom it may concern:*

Be it known that I, LOUIS G. BOURGOIN, a citizen of the Republic of France, and resident of the city of Montreal, in the Province of Quebec and Dominion of Canada, have invented new and useful Improvements in Processes for the Acetylenation of Fatty and Other Substances, of which the following is a full, clear, and exact description.

This invention relates to the production of new and useful products comprising synthetic, plastic and resinous materials, which may be adapted for various uses, such as electric insulation, artificial rubber, as well as various other uses. The invention also involves the process of making the product.

The process consists in the treatment of substances or mixtures of substances susceptible of combination with acetylene together with calcium carbide, powdered or in lump form, in such a way that the carbide will be decomposed and generate acetylene.

The process is carried out in the following manner. The substance to be treated is mixed with a certain weight of calcium carbide which should be in proportion to the molecular weight of the substance to be treated. The acetylenation can be carried out in several ways, some of which are detailed below.

One way is to heat, at atmospheric pressure, the substance with the carbide, or the substance with the carbide, together with a salt capable of giving up its water of crystallization at the required temperature, or the substance with the carbide allowing steam or water vapor at a certain temperature to come in contact with the mixture.

Another way is to use a closed vessel capable of generating steam. The mixture of carbide and the substance to be treated is placed in an open vessel which is placed in the closed vessel at a temperature of over 100° C. The superheated steam in the closed vessel comes in contact with the carbide to decompose it into acetylene and hydrated lime, or acetylene and anhydrous lime. The acetylene combines with the substance so treated and the water vapor acts as a catalyzer. In this way several molecules of the acetylene are absorbed and entirely new products may be obtained. When operating on solids it is necessary to raise the temperature high enough to melt the substance. It will be seen that, the greater the amount of acetylene to be absorbed the longer the treatment must be carried on. Reaction generally takes place inside of five hours at temperatures ranging between 100° to 350° C. A further way to cause acetylenation is to place the mixture of substances to be treated with the carbide within a closed vessel and then heat same. When the temperature is sufficiently high, steam under pressure is introduced and decomposes the carbide after the melting point of the substance under treatment has been attained. The lime residue resulting from the treatment is easily separated from the masses obtained, and the impurities in the acetylene have, apparently, no injurious effect on the product. When substances are used which are volatile below 100° C. or which decompose below that temperature, they must be mixed with other substances to raise their points of volatilization, or they must be mixed with a carrier which will assure their stability at the required temperature. The process is very simple and inexpensive and the product is made quickly and without danger to the operator. The resulting product is of a higher molecular weight than the original substances used and possesses new physical and chemical properties. The principal feature of the process lies in using the carbide mixed with the substance treated to operate with nascent acetylene, thus utilizing the energy of formation of the carbide which is liberated at the time of its decomposition into acetylene and lime.

As an example, I will give a more specific case. I take approximately from five to eight parts, by weight, of calcium carbide (in proportion to the molecular weight of the substance to be treated) in suitable form and subject same, in a closed vessel, to the action of heat and steam, under pressure, with approximately one hundred parts of an animal or vegetable fatty substance, or a mixture of fatty acid and glycerine, or other similar substances. By the application of heat, the water vapor under pressure comes in contact with the carbide, so as to decompose it at a temperature of 180° to 250° C. within a period of two hours. During this process, there is a chemical reaction between the acetylene gas, generated from the carbide, and the fatty substances. Residual lime is found after the operation and, on cooling, a product is obtained consisting of a solid substance of varying consistency according to the proportion of carbide used and also according to the mixture of fatty substance used. If the new compound is taken out before cooling, at about 80° C. I obtain a product of high viscosity which will solidify upon cooling. The melting point of the compound is in direct ratio to the hardness of the compound obtained. The weight of the new compound is greater than the combined weights of the substances employed in the process. This shows clearly that the water in the form of steam has played a part in the chemical reaction.

This new substance is plastic, malleable when hot, is easy to mould and machine, and is insoluble in water, acetone, alcohol, ammonia and many other well known solvents. It is soluble in carbon-tetrachloride, carbon disulfide, and sulphuric ether.

Having thus described my invention, what I claim is:—

1. The process for the acetylenation of organic substances, which consists in the treatment of substances, susceptible of combination with acetylene, together with calcium carbide, in such a way that the carbide will be decomposed by water or steam and generate acetylene which will combine with the substances to form a new product.

2. The process for the acetylenation of organic substances which consists in mixing same with calcium carbide and then heating the mass in such a manner that the carbide is decomposed by water or steam and then allowing the nascent acetylene to combine with the substances to produce a plastic material.

3. The process for the acetylenation of organic substances which consists in heating the mixture of a substance, susceptible of combination with acetylene, and calcium carbide, together with a salt capable of giving up its water of crystallization at the required temperature.

4. The process for the acetylenation of organic substances which consists in heating the mixture of a substance, susceptible of combination with acetylene, and calcium carbide, and allowing steam or water vapor to come in contact with the mixture.

5. The process for the acetylenation of organic substances which consists in placing a mixture of a substance, susceptible of combination with acetylene, and calcium carbide in an open vessel at a temperature above 100° C. placing the open vessel in a closed vessel capable of generating steam, and allowing the superheated steam, under pressure, in the closed vessel to come in contact with the calcium carbide to decompose it into acetylene and hydrated lime.

6. The process for the acetylenation of organic substances which consists in placing a mixture of a substance, susceptible of combination with acetylene, and calcium carbide in a closed vessel, heating the vessel until the melting point of the substance has been attained and then admitting steam under pressure into the vessel to decompose the carbide into acetylene and hydrated lime.

7. The process for the acetylenation of organic substances, which consists in placing a mixture of a substance, susceptible of combination with acetylene, and calcium carbide, in a closed vessel, heating the mixture until the melting point of the substance has been attained, admitting steam under pressure into the vessel to decompose the carbide into acetylene and hydrated lime and allowing the acetylene to be absorbed by the substance to form a product having new physical and chemical properties.

8. The process for the acetylenation of organic substances which consists in placing a mixture of substances susceptible of combination with acetylene and having a volatile point of more than 100° C. and calcium carbide in a closed vessel, heating the mixture until the melting point of the substance has been attained, admitting steam under pressure into the vessel to decompose the carbide into acetylene and hydrated lime, so that nascent acetylene will be absorbed by the substance, cooling the new product and withdrawing the hydrated lime from the vessel, leaving a plastic product which may be moulded into any desired shape and which will solidify when cold.

9. The process for the acetylenation of substances, which consists in mixing at ordinary temperatures five to eight parts, in weight, of calcium carbide and approximately one hundred parts of fatty substances, placing the mixture in a closed vessel, subjecting the mixture to the action of heat, admitting steam or water vapor to the vessel to decompose the carbide into acetylene and hydrated lime, and allowing the acetylene to come into contact with the substances to form a plastic product.

10. A process which consists in mixing calcium carbide with fatty substances, placing the mixture in a vessel and subjecting same to the action of heat and steam, whereby the carbide will be decomposed and the nascent acetylene will combine with the fatty substances to produce a resinous product.

11. A plastic, resinous product obtained by mixing calcium carbide with fatty substances and decomposing the carbide to allow the resultant acetylene to combine with the fatty substances.

In witness whereof, I have hereunto set my hand.

LOUIS G. BOURGOIN.